United States Patent [19]

Hashimoto et al.

[11] Patent Number: 5,295,132
[45] Date of Patent: Mar. 15, 1994

[54] MULTIPLEX TRANSMISSION APPARATUS WITH TRANSMISSION LINE FAULT DETECTION

[75] Inventors: Kyosuke Hashimoto; Kiyoshi Inoue; Yuichi Watanabe, all of Hiratsuka, Japan

[73] Assignee: The Furukawa Electric Co., Ltd., Tokyo, Japan

[21] Appl. No.: 935,536

[22] Filed: Aug. 25, 1992

[30] Foreign Application Priority Data

Aug. 27, 1991 [JP] Japan .................... 3-214982
Aug. 30, 1991 [JP] Japan .................... 3-220105
Nov. 29, 1991 [JP] Japan .................... 3-316660

[51] Int. Cl.$^5$ ............................ H04J 1/16; H04J 3/14
[52] U.S. Cl. ................................. 370/13; 307/355; 307/360
[58] Field of Search ................. 370/13, 113, 14, 16; 375/17; 371/68.1, 68.2, 57.1, 8.1, 8.2, 11.1, 11.2; 307/360, 362, 355; 340/825.06, 825.16

[56] References Cited

U.S. PATENT DOCUMENTS

| | | | |
|---|---|---|---|
| 4,233,682 | 11/1980 | Liebergot et al. | 371/68.1 |
| 4,677,627 | 6/1987 | Hong | 371/57.1 |
| 4,792,950 | 12/1988 | Volk et al. | |
| 5,097,147 | 3/1992 | Stuebing et al. | 307/360 |
| 5,185,735 | 2/1993 | Ernst | 370/13 |

FOREIGN PATENT DOCUMENTS

0329514 8/1989 European Pat. Off. .
0427638 5/1991 European Pat. Off. .
2-20998 1/1990 Japan .
WO90/09713 8/1990 PCT Int'l Appl. .

Primary Examiner—Douglas W. Olms
Assistant Examiner—Ajit Patel
Attorney, Agent, or Firm—Frishauf, Holtz, Goodman & Woodward

[57] ABSTRACT

A multiplex transmission apparatus in accordance with the present invention is interconnected with other multiplex transmission apparatuses via common transmission lines, and it is used for a multiplex transmission system which performs data transmission. The multiplex transmission apparatus comprises voltage converting circuits which detect voltages of the transmission lines, the first comparator which compares the detected voltages, the second comparator which compares one voltage of the detected voltages with a reference voltage, and the third comparator which compares the other detected voltage with a reference voltage. The comparators supply the comparison results to differential circuits, respectively, set the output of the differential circuit linked to a comparator, which is connected to a faulty line, for "L", and determine the logical sum of the outputs of the differential circuits by a logical synthesizing circuit. By applying the determined logical sum to a multiplex transmission control circuit, the apparatus makes it possible to reduce wasteful message transmission and successfully cope with faults in the transmission lines without causing delay in transmission of messages which require quick responses and without increasing the traffic volume of the transmission lines. The multiplex transmission control circuit detects signals on the transmission lines according to the comparison results of the comparators.

14 Claims, 9 Drawing Sheets

MULTIPLEX TRANSMISSION APPARATUS WITH TRANSMISSION LINE FAULT DETECTION

BACKGROUND OF THE INVENTION

1. Field of the Invention

The present invention relates to a multiplex transmission apparatus which is connected to multiplex transmission lines to detect signals transmitted to the multiplex transmission lines.

2. Description of the Related Art

This type of multiplex transmission apparatus is found, for example, in the publication of Unexamined Japanese Patent Application No. H2-20998. In this multiplex transmission apparatus, three comparators are connected to two transmission lines, i.e., the first and second transmission lines, via a filter circuit. These comparators compare voltages received from the two transmission lines, and also compare the voltage received from one of the transmission lines with a present bias voltage. Outputs from these comparators are supplied to a fault detecting means and a multiplexer. The fault detecting means detects faults in the transmission lines in accordance with outputs of these comparators and sends the first and second output signals based on the aforementioned fault to the multiplexer. In the multiplexer, one of the outputs of the comparators is selected, and the selected output is supplied to a multiplex transmission control circuit or the like. This multiplexer determines the above-mentioned output to be selected in accordance with output signals received from the aforementioned fault detecting means.

More specifically, if neither transmission line has a fault, then both output signals of the fault detecting means become "0", and the output of the first comparator, for instance, is selected as the output of the multiplexer. If there is a fault in the first transmission line, then the first output signal from the fault detecting means becomes "0", while the second output signal becomes "1", the output of the second comparator being selected as the selected output of the multiplexer. If the second transmission line has a fault, the first output signal from the fault detecting means becomes "1", and the second output signal "1", the output of the third comparator being selected as the selected output of the multiplexer. Thus, in the multiplex transmission apparatus, signals received from both transmission lines are supplied to three comparators, the fault detecting means detects faults in the transmission lines from the outputs of the comparators, and the multiplexer selects one receivable comparator output in accordance with the detection result.

In this multiplex transmission apparatus, if a fault takes place in a transmission line, comparator outputs are switched by the multiplexer even while signal messages are being received from the transmission line. This disables the multiplex transmission apparatus from receiving the messages and therefore the apparatus has to re-receive the same messages which are re-sent. Thus, in multiplex transmission which requires quick message transmission, this multiplex transmission apparatus is likely to develop delayed operation due to delay in transmission. Further, in this multiplex transmission apparatus, a large traffic volume of the transmission lines results in a further increased traffic volume, possibly leading to significant transmission delay in the whole multiplex transmission system. Further, the multiplex transmission apparatus disclosed in the aforementioned Japanese publication uses a special frame, and thus is limited in application.

SUMMARY OF THE INVENTION

The present invention is intended to solve the above-mentioned problems, and it is accordingly an object of this invention to provide a multiplex transmission apparatus which has a wide range of application, and which is capable of reducing wasteful message communication and coping with a fault in a transmission line without causing delay in transmission of a message, which requires a quick response, and without increasing the traffic volume of the transmission lines.

Another object of the present invention is to provide a multiplex transmission apparatus which is capable of recovering communication even if such failures as a short circuit between the two transmission lines occur.

The aforementioned objects are fulfilled by the multiplex transmission apparatus in accordance with the present invention, the multiplex transmission apparatus being interconnected with other multiplex transmission apparatuses via at least two common transmission lines, which multiplex transmission apparatus comprises;

a converting means which converts the signals of the foregoing transmission lines into corresponding voltages;

first comparing means which compares the converted voltages of the transmission lines;

second comparing means which compares one of the converted transmission line voltages with a predetermined reference voltage;

third comparing means which compares the other of the converted transmission line voltages with a predetermined reference voltage;

first output means which issues a low-level signal when an output level of the comparison result of the foregoing first comparing means stays at a high level for a predetermined time;

second output means which issues a low-level signal when an output level of the comparison result of the foregoing second comparing means stays at a high level for a predetermined time;

third output means which issues a low-level signal when an output level of the comparison result of the foregoing third comparing means stays at a high level for a predetermined time;

a logical synthesizing means which logically synthesizes the outputs of the foregoing output means; and a signal detecting means which receives the synthesizing results of the foregoing logical synthesizing means and detects signals in the foregoing transmission lines according to the synthesizing result.

According to the aforementioned multiplex transmission apparatus, an output from the first comparing means is sent to the first output means, an output from the second comparing means to the second output means, and an output from the third comparing means to the third output means; the output of the output means which is linked to the comparing means connected to a transmission line incurring a fault is set to the low level; and a logical sum of the outputs of the respective output means is supplied to the receiving means. Thus, even if a transmission line incurs a fault while signals are being received, the receiving of the signal can be continued, permitting transmission of messages without any waste.

DESCRIPTION OF THE PREFERRED EMBODIMENTS

Figure 1:
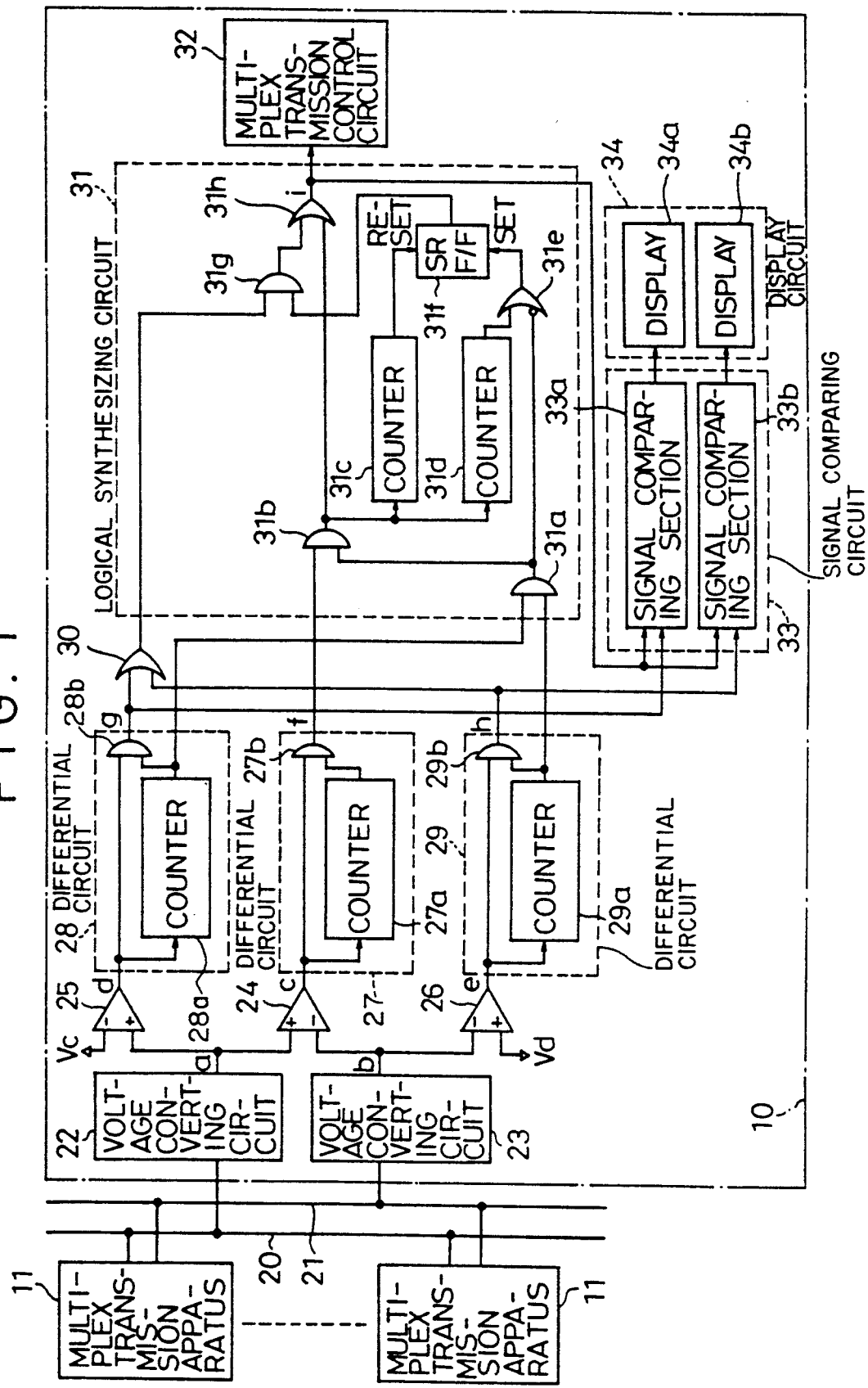
FIG. 1 is a configuration block diagram which illustrates the first embodiment of the multiplex transmission apparatus in accordance with the present invention.

Referring to FIG. 1, a multiplex transmission apparatus 10 in accordance with the present invention is interconnected with other multiplex transmission apparatuses 11 via two transmission lines 20 and 21. In this multiplex transmission apparatus 10, three comparators 24 through 26 are connected to the transmission lines 20 and 21 via voltage converting circuits 22 and 23.

The comparator 24 compares voltages "a" and "b" from the two transmission lines 20 and 21. The comparator 25 compares the voltage "a" from the transmission line 20 with a reference voltage Vc. The comparator 26 compares the voltage "b" from the transmission line 21 with a reference voltage Vd.

Figure 2:
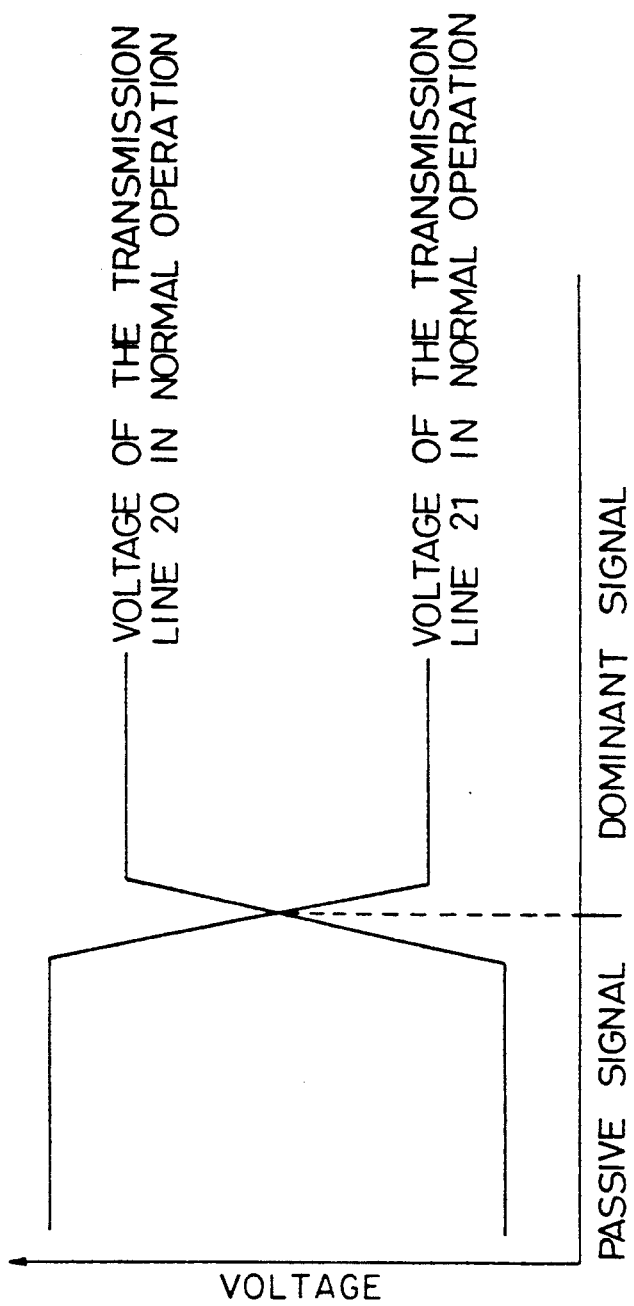
FIG. 2 is a diagram which shows the relationship between signals and voltages when the transmission lines are normal.
Figure 3:
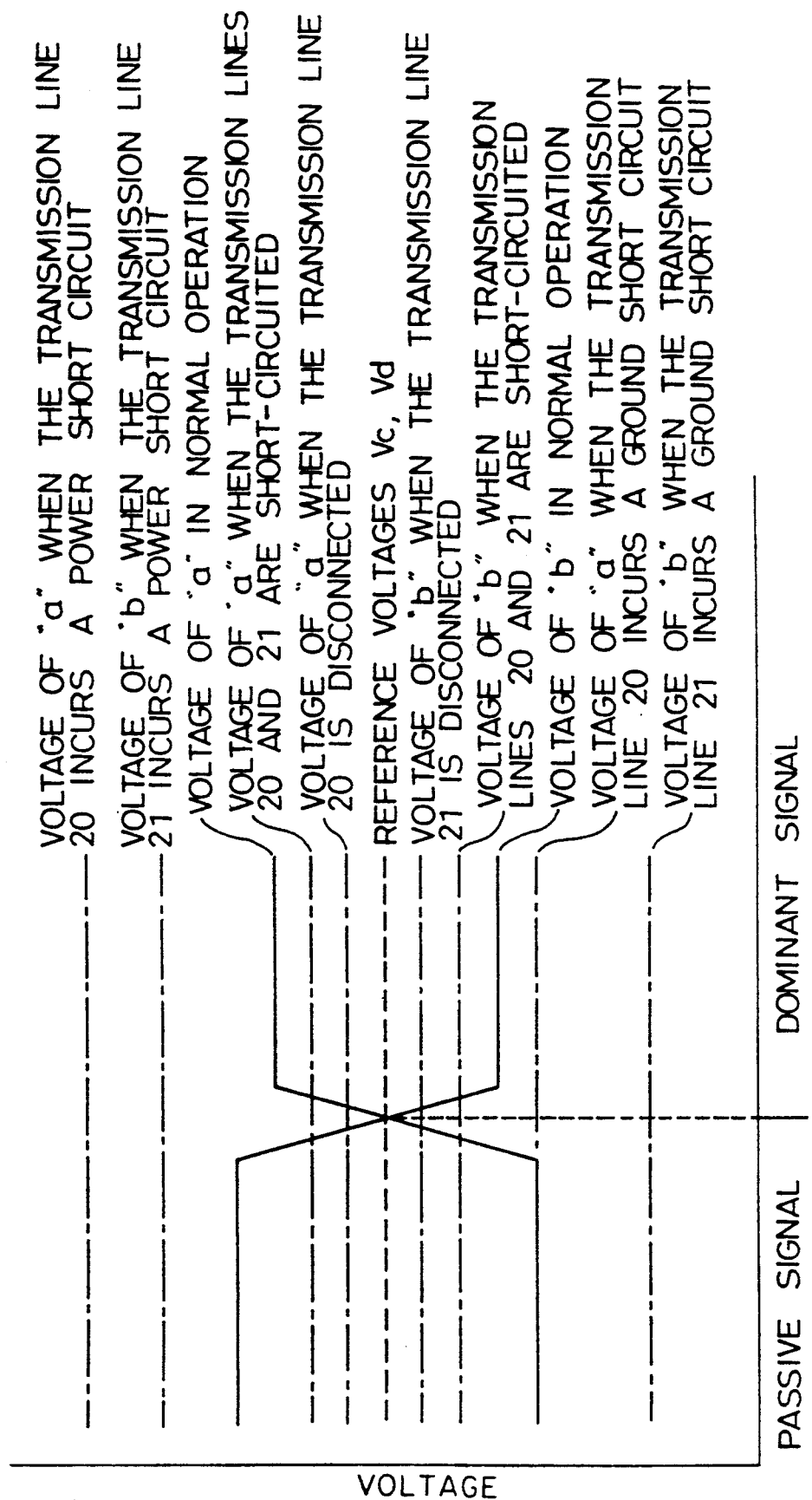
FIG. 3 is a diagram which shows output voltages in the voltage converting circuits shown in FIG. 1.

When the transmission lines 20 and 21 are normal, the signal voltages of the transmission lines 20 and 21 exhibit the voltage waveforms shown in FIG. 2. The passive signal shown in the figure provides an input of a multiplex transmission control circuit 32 to be discussed later; in other words, it refers to a signal on the transmission line 20 or 21 where an output "i" of a logical synthesizing circuit 31 is expected to be at low level. The dominant signal refers to a signal on the transmission line 20 or 21 where the aforementioned output "i" is expected to be at high level. The signals on the transmission lines 20 and 21 are converted by voltage converting circuits 22 and 23 to output voltages "a" and "b" in the states shown in FIG. 3. Further, in this embodiment, the reference voltages Vc and Vd supplied to the comparators 25 and 26 are set as shown in FIG. 3.

The relationship between the individual states of the transmission lines 20 and 21 and the corresponding outputs of the comparators 24 through 26 is as shown in Table 1.

TABLE 1

| Mode | State of transmission lines | Comparator output | Passive | Dominant |
|---|---|---|---|---|
| 1 | Normal | Output c of the 1st comparator 24 | "L" | "H" |
| | | Output d of the 2nd comparator 25 | "L" | "H" |
| | | Output e of the 3rd comparator 26 | "L" | "H" |
| 2 | Fault: Power short circuit in transmission line 20 | Output c of the 1st comparator 24 | "H" | "H" |
| | | Output d of the 2nd comparator 25 | "H" | "H" |
| | | Output e of the 3rd comparator 26 | "L" | "H" |
| 3 | Fault: Power short circuit in transmission line 21 | Output c of the 1st comparator 24 | "L" | "L" |
| | | Output d of the 2nd comparator 25 | "L" | "H" |
| | | Output e of the 3rd comparator 26 | "L" | "L" |
| 4 | Fault: GND short circuit in transmission line 20 | Output c of the 1st comparator 24 | "L" | "L" |
| | | Output d of the 2nd comparator 25 | "L" | "L" |
| | | Output e of the 3rd comparator 26 | "L" | "H" |
| 5 | Fault: GND short circuit in transmission line 21 | Output c of the 1st comparator 24 | "H" | "H" |
| | | Output d of the 2nd comparator 25 | "L" | "H" |
| | | Output e of the 3rd comparator 26 | "H" | "H" |
| 6 | Fault: Disconnection in transmission line 20 | Output c of the 1st comparator 24 | "L" | "H" |
| | | Output d of the 2nd comparator 25 | "H" | "H" |
| | | Output e of the 3rd | "L" | "H" |

TABLE 1-continued

| Mode | State of transmission lines | Comparator output | Passive | Dominant |
|---|---|---|---|---|
| | | comparator 26 | | |
| 7 | Fault: Disconnection in transmission line 21 | Output c of the 1st comparator 24 | "L" | "H" |
| | | Output d of the 2nd comparator 25 | "L" | "H" |
| | | Output e of the 3rd comparator 26 | "H" | "H" |
| 8 | Fault: Short circuit between transmission lines 20 and 21 | Output c of the 1st comparator 24 | "H" ("H") | "H" ("H") |
| | | Output d of the 2nd comparator 25 | "H" ("H") | "L" ("H") |
| | | Output e of the 3rd comparator 26 | "L" ("H") | "H" ("H") |

The voltages "a" and "b" after conversion will be as shown in FIG. 3 when the transmission lines 20 and 21 are normal and free of any failures. In response to the passive signal, all outputs "c" through "e" of the respective comparators 24 through 26 will be low level (hereinafter referred to as "L") as shown in the mode 1 of Table 1. In response to the dominant signal, all outputs "c" through "e" of the comparators 24 through 26 will be high level (hereinafter referred to as "H"). Also, the outputs "c" through "e" of the comparators 24 through 26 will be as shown in the modes 2 through 7 of Table 1 when the faults shown in FIG. 3 occur. The mode 8 is an example of the second embodiment to be discussed later.

The outputs "c" through "e" of the comparators 24 through 26 are supplied to differential circuits 27 through 29, respectively. In the multiplex transmission apparatus 10, the differential circuit 27 comprises a counter 27a and an AND gate 27b, the differential circuit 28 comprises a counter 28a and an AND gate 28b, and the differential circuit 29 comprises a counter 29a and an AND gate 29b. The outputs "c" through "e" of the comparators 24 through 26 are supplied to the counters 27a, 28a, and 29a, and the AND gates 27b, 28b, and 29b.

The counters 27a, 28a, and 29a detect whether the outputs "c" through "e" of the comparators 24 through 26 stay in the "H" state for a predetermined time, e.g., for more than T1 time. The counters 27a, 28a, and 29a issue "L" if the outputs "c" through "e" of the comparators 24 through 26 stay in the "H" state for more than the T1 time while they issue "H" in normal operation. In this embodiment, the predetermined time T1 is longer than the longest "H" signal in a message, i.e., it is equivalent to approximately a ½ to 1 message length. The time T1 may differ among the counters 27a through 29a.

The AND gates 27b, 28b, and 29b calculate logical products of the outputs "c" through "e" of the comparators 24 through 26 and the outputs of the counters 27a through 29a, and then issue the calculation results.

Outputs "g" and "h" of the AND gates 28b and 29b are supplied to an OR gate 30 and a signal comparing circuit 33, respectively. The outputs of the counters 28a and 29a are sent to a logical synthesizing circuit 31 other than the aforementioned AND gates 28b and 29b. Further, an output "f" of the AND gate 27b is supplied to the logical synthesizing circuit 31.

The OR gate 30 supplies a logical sum of the outputs "g" and "h" of the AND gates 28b and 29b to the logical synthesizing circuit 31.

The logical synthesizing circuit 31 of the multiplex transmission apparatus 10 is comprised of an AND gate 31a connected to the counters 28a and 29a, an AND gate 31b connected to the AND gate 27b and the AND gate 31a, counters 31c and 31d connected to the AND gate 31b, an OR gate 31e connected to the AND gate 31a and the counter 31d, an RS flip-flop 31f connected to the counter 31c and the OR gate 31e, an AND gate 31g, and an OR gate 31h connected to the AND gate 31b and the AND gate 31g.

The AND gate 31a calculates logical products of the outputs received from the counters 28a and 29a and sends the calculation results to the AND gate 31b and the OR gate 31e.

The AND gate 31b calculates logical products of the output "f" received from the AND gate 27b and the output received from the AND gate 31a, and sends the calculation results to the counters 31c and 31d, and the OR gate 31h.

The counter 31c detects whether an output from the AND gate 31b stays in the "H" state for more than a predetermined time, for example, T2 time. If the output from the AND gate 31b stays in the "H" state for more than the aforementioned T2 time, then the counter 31c applies an "H" reset signal to the RS flip-flop 31f. In this embodiment, the predetermined time T2 is approximately equivalent to a length of ½ to 10 bits.

The counter 31d detects whether an output of the AND gate 31b stays in the "L" state for more than the aforementioned predetermined time T1. If the output of the AND gate 31b stays in the "L" state for more than the T1 time, then the counter 31d issues the "H" set signal to the OR gate 31e.

The OR gate 31e calculates logical sums of the outputs received from the AND gate 31a and the counter 31d. and applies the set signal, which is the calculation result, to the RS flip-flop 31f.

The RS flip-flop 31f is reset by the reset signal received from the counter 31c, while it is set by the set signal received from the OR gate 31e, and it sends the "H" signal to the AND gate 31g.

The AND gate 31g calculates logical products of the outputs from the OR gate 30 and the RS flip-flop 31f, and applies the calculation results to the OR gate 31h.

The OR gate 31h calculates the logical sums of the outputs from the AND gates 31b and 31g and applies the calculation results (data) "i" to the multiplex transmission control circuit 32 and the signal comparing circuit 33.

The multiplex transmission control circuit 32 takes in the data "i" from the OR gate 31h and controls the connected devices according to the aforementioned data "i".

The signal comparing circuit 33 comprises a signal comparator 33a connected to the AND gate 28b and the OR gate 31h, and a signal comparator 33b connected to the AND gate 29b and the OR gate 31h.

The signal comparator 33a compares an output "g" from the AND gate 28b with an output "i" from the OR gate 31h, and supplies the comparison result to a display circuit 34.

The signal comparator 33b compares the output h given by the AND gate 29b with the output i given by the OR gate 31h, and supplies the comparison result to the display circuit 34.

The display circuit 34 comprises a display 34a, which shows the comparison results (information on failures in the transmission line 20) given by the signal comparator 33a, and a display 34b which shows the comparison results (information on failures in the transmission line 21) given by the signal comparator 33b.

The operation of the multiplex transmission apparatus 10 shown in FIG. 1 will now be described for each mode shown in Table 1. For the convenience of explanation, the modes 1 through 3 will be explained.

In the mode 1, if the signal transmitted to the transmission lines 20 and 21 is the passive signal as shown in Table 1, then all outputs "c" through "e" of the comparators 24 through 26 will be in the "L" state. Likewise, in the mode 1, if the signal transmitted to the transmission lines 20 and 21 is the dominant signal as shown in Table 1, then all outputs "c" through "e" will be in the "H" state. Accordingly, as long as the transmission lines 20 and 21 stay in the normal condition, the "H" state, which continues for more than the predetermined time T1, does not exist in the outputs "c" through "e" of the comparators 24 through 26. Therefore, the counters 27a, 28a, and 29a always issue "H", causing the AND gates 27b, 28b, and 29b to open, and the outputs "c" through "e" of the comparators 24 through 26 will be the outputs "f" through "h".

If the multiplex transmission apparatus 10 is in an idle state where no message is received from the transmission lines 20 and 21, that is, if the passive signal lasts for more than 1 message long, then the output "f" of the AND gate 27b will be "L" also for more than 1 message long. This causes the counter 31d to issue the set signal to set the RS flip-flop 31f. When the RS flip-flop 31f has been set and the "H" signal is issued, the AND gate 31g is opened. Then the AND gate 31g lets the logical sum of the outputs "g" and "h" of the AND gates 28b and 29b, i.e., the output of the OR gate 30, pass.

The AND gate 31a also issues "H", causing the AND gate 31b to open; therefore, the output "f" of the AND gate 27b passes through the AND gate 31b. Accordingly, the logical sum of the outputs "f" through "h" is supplied as the output "i" from the OR gate 31h to the multiplex transmission control circuit 32.

Then, when a message is received, a signal on the transmission line 20 or 21 is switched from the passive signal to the dominant signal, causing the output "f" of the AND gate 27b to become "H". If the level of the output "f" stays in the "H" state for more than the ½ bit long, then the counter 31c issues the reset signal to reset the RS flip-flop 31f. By this reset signal, the RS flip-flop 31f is reset and it issues the "L" signal, causing the AND gate 31g to close. Accordingly, the output "f" from the AND gate 27b is applied to the output "i" of the OR gate 31h, and the output i is taken into the multiplex transmission control circuit 32. In the multiplex transmission control circuit 32, signals on the transmission sion lines are detected in accordance with the output "i" which is the comparison result of the comparators 24 through 26. The state, where the output "f" is issued as the output "i" to the multiplex transmission control circuit 32, lasts until a message ends and the passive signal, which is longer than 1 message, is detected. The reason that only the output "f" from the AND gate 27b is supplied while messages are being received is because the comparator 24 has higher resistance to noises than the comparators 25 and 26.

The signal comparator 33a takes the then outputs "g" and "i" from the AND gate 28b and the OR gate 31h and compares these outputs "g" and "i". The signal comparator 33b also takes in the then outputs "h" and "i" from the AND gate 29b and the OR gate 31h and compares these outputs "h" and "i". In this case, the aforementioned outputs "g" and "i", and the outputs "h" and "i" coincide with each other, respectively; therefore, the signal comparators 33a and 33b output information, which indicates that the transmission lines 20 and 21 are normal, to the displays 34a and 34b, so that the displays 34a and 34b can indicate the aforementioned information.

In the case of the mode 2, as shown in Table 1, the outputs "c" and "d" of the comparators 24 and 25 will always be "H" whether the signals on the transmission lines 20 and 21 are passive or dominant. Accordingly, the AND gates 27b and 28b are closed by the outputs from the counters 27a and 28a. The outputs "c" and "d" from the comparators 24 and 25 do not appear in the outputs "f" and "g" of the AND gates 27b and 28b, and therefore the outputs will always be "L". However, the output "e" of the comparator 26 becomes at the same output level as that in the aforementioned normal condition; therefore the counter 29a can always issue "H". This causes the AND gate 29b to open, and the output "e" of the comparator 26 to appear in the output "h" of the AND gate 29b.

At this time, the AND gate 31a is closed by the output received from the counter 28a, and the output of the AND gate 31a becomes "L". Accordingly, the AND gate 31b is closed, the output of the OR gate 31e becomes "H", and the RS flip-flop 31f is set, causing the AND gate 31g to open. Therefore, a logical sum of the outputs g and h from the AND gates 28b and 29b appears in the output "i" of the OR gate 31h, and this output "i" is taken into the multiplex transmission control circuit 32. The multiplex transmission control circuit 32 detects signals on the transmission lines in accordance with the output "i" which is a comparison result of the comparators 24 through 26.

The signal comparator 33a takes in the then outputs "g" and "i" from the AND gate 28b and the OR gate 31h and compares the outputs "g" and "i". In this case, the outputs "g" and "i" disagree; therefore, the signal comparator 33a outputs information, which indicates that the transmission line 20 has incurred a failure, to the display 34a, so that the display 34a can indicate the aforementioned information.

In this mode 2, for the output "i" of the OR gate 31h, only the output "f" can be excluded from the output of a logical sum of the outputs "f" through "h", eliminating the need of switching the outputs of the comparators as in the prior art.

In the case of the mode 3, as shown in Table 1, the outputs "c" and "e" of the comparators 24 and 26 will always be "L" whether the signals on the transmission lines 20 and 21 are passive or dominant. Accordingly, the AND gates 27b and 29b are closed by the outputs "c" and "e" from the comparators 24 and 26, and the outputs "f" and "h" from the AND gates 27b and 29b always become "L". However, the output d of the comparator 25 is at the same output level as that in the aforementioned normal mode; therefore, the AND gate 28b is opened, and the output "d" of the comparator 25 appears in the output "g" of the AND gate 28b.

At this time, the output of the AND gate 31a is "H", but the output "f" of the AND gate 27b is "L", and therefore the output of the AND gate 31b becomes "L". Accordingly, the output given by the counter 31d becomes "H", and the RS flip-flop 31f is set, causing the AND gate 31g to open. Therefore, a logical sum of the outputs "f" through "h" from the AND gates 27b, 28b and 29b appears in the output "i" of the OR gate 31h, and this output "i" is taken into the multiplex transmission control circuit 32. The multiplex transmission control circuit 32 detects signals on the transmission lines in accordance with the output "i" which is a comparison result of the comparators 24 through 26.

The signal comparator 33b takes in the then outputs "h" and "i" from the AND gate 29b and the OR gate 31h, and compares the outputs "h" and "i". In this case, the outputs "h" and "i" disagree; therefore, the signal comparator 33b outputs information, which indicates that the transmission line 21 has incurred a failure, to the display 34b, so that the display 34b can indicate the aforementioned information.

In this mode 3, it is preset so that the outputs "f" and "h" become "L" in the logical sums of the outputs "f" through "h", thus eliminating the need of switching the outputs of the comparators as in the prior art.

Likewise, for the modes 4 through 7, the output "i" can be determined in the logical sums of the outputs "f" through "h" by following the same approach as that for the aforementioned mode 2 or 3.

Thus, in this embodiment, it is arranged so that one of the three or more comparators remains capable of receiving even if one of the transmission lines fails, and the outputs of these comparators pass through their respective differential circuits, thus automatically setting the output of the differential circuit, which is linked to a comparator connected to the faulty transmission line, to "L". Only normal signals are sent to the multiplex transmission control circuit by using a logical sum of the outputs of those differential circuits as the input to the multiplex transmission control circuit. This enables, in this embodiment, automatic receiving without depending on message receiving even if one of the transmission lines incurs a failure, thus making it possible to perform message transmission with no waste. Further, in this embodiment, the constants of the differential circuits are set such that the respective counters remain in "H" state for a fixed time. It is therefore possible to use an ordinary frame and thus a wide range of application is ensured.

Figure 4:
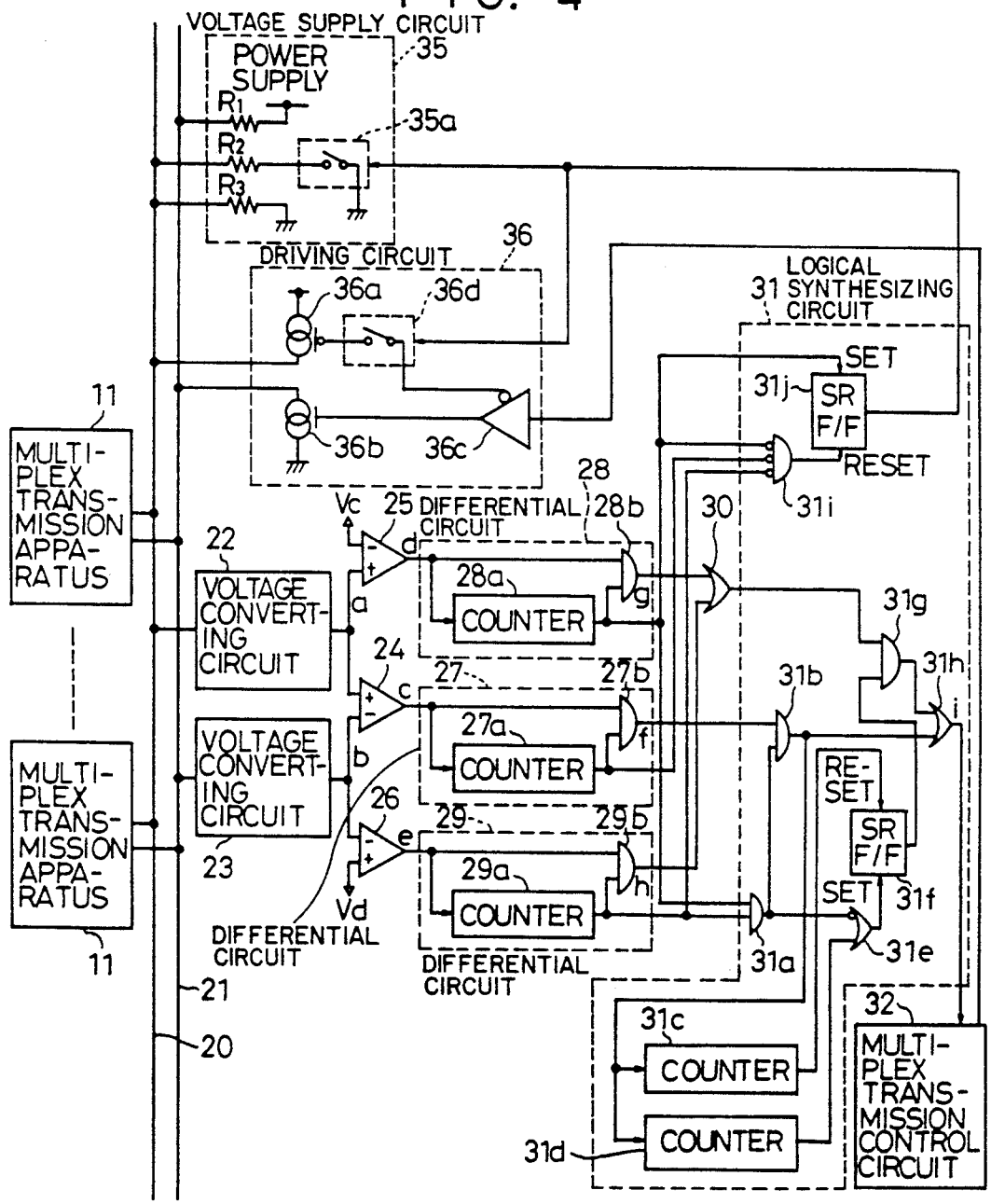
FIG. 4 is a configuration block diagram which shows the second embodiment of the multiplex transmission apparatus in accordance with the present invention.

FIG. 4 is a configuration block diagram which shows the second embodiment of the multiplex transmission apparatus in accordance with the present invention. In the figure, the same sections as those in the first embodiment of FIG. 1 are assigned the same signs for the convenience of explanation.

Referring to FIG. 4, the configuration of this multiplex transmission apparatus differs from that of the first embodiment in that the outputs of the counters 27a through 29a are supplied to an AND gate 31i of the logical synthesizing circuit 31 in addition to the sections shown in the first embodiment and that the RS flip-flop 31j of the logical synthesizing circuit 31 is set by an output of the counter 28a and reset by an output of the AND gate 31i. Further in this embodiment, the transmission lines are connected to a bias voltage supply circuit 35 and a driving circuit 36 when the RS flip-flop 31j is set, while the transmission lines are disconnected from the bias voltage supply circuit 35 and the driving circuit 36 when the RS flip-flop 31j is reset.

The bias voltage supply circuit 35 comprises a resistor R1 connected between the transmission line 21 and the power supply, a resistor R2 connected between the transmission line 20 and the ground, a switch 35a which is provided between the resistor R2 and the ground and which is switched by an output of the RS flip-flop 31j, and a resistor R3 connected between the transmission line 20 and the ground, and it supplies bias voltage to the transmission lines 20 and 21. By setting the resistance value of the resistor R3 sufficiently higher than those of the resistors R1 and R2, e.g., by setting the resistance value of the resistor R3 to about 1 k$\Omega$ when the values of the resistors R1 and R2 are about 100$\Omega$, the bias voltage of the transmission lines is adequately set to the power supply side even in the event that the transmission lines 20 and 21 are short-circuited.

The driving circuit 36 comprises a constant-current section 36a which supplies current to the transmission line 20, a constant-current section 36b which takes in currents from the transmission line 21, a buffer 36c provided between the constant-current section 36b and the multiplex transmission control circuit 32, and a switch 36d which is switched by an output of the RS flip-flop 31j.

The relationship between the individual states of the transmission lines 20 and 21 and the outputs of the comparators 24 through 26 is as shown by the modes 1 through 8 in Table 1. If the transmission lines 20 and 21 in the mode 8 are short-circuited, voltages "a" and "b" will be as shown in FIG. 3 if the transmission lines are not disconnected from the bias voltage supply circuit 35 and the driving circuit 36. In this case, the outputs "c" through "e" of the comparators 24 through 26 will be as shown by the parenthesized states in the mode 8 of Table 1. In other words, the outputs "c" through "e" of the comparators 24 through 26 will be all "H" whether the signal is passive or dominant, but if the voltage supply circuit 35 and the driving circuit 36 are disconnected from the transmission lines, the outputs "c" and "d" in response to the passive signal will be "H", while the output "e" will be "L". The outputs "c" and "e" in response to the dominant signal will be "H", while the output "d" will be "L".

The operation of the multiplex transmission apparatus shown in FIG. 4 will now be described for each of the modes given in Table 1. The behaviors in the modes 1 through 7 are the same as those in the first embodiment; therefore, the behavior in the mode 8 will be described.

In the mode 8, as shown by the parenthesized states of Table 1, when the bias voltage supply circuit 35 and the driving circuit 36 are not disconnected from the transmission lines, all the outputs "c" through "e" of the comparators 24 through 26 will be "H" whether the signal is passive or dominant. Accordingly, all the outputs of the counters 27a through 29a will be "L", and the output of the AND gate 31i will be "H", causing the RS flip-flop 31j to be reset. The reset RS flip-flop 31j opens the switches 35a and 36d, thus disconnecting the bias voltage supply circuit 35 and the driving circuit 36 from the transmission lines.

In this embodiment, it is preset so that the outputs of the counters 27a through 29a become "L" in response to the input of "H" when "H" is detected for longer than 1 message; therefore, the outputs "f" and "g" of the AND gates 27b and 28b become "L", and the outputs of the AND gates 31a and 31b become "L". This causes the RS flip-flop 31f to be set, opening the AND gate 31g. Accordingly, an output of the OR gate 30 which has passed through the AND gate 31g, i.e., the logical sum of the outputs "g" and "h" of the differential circuits 28 and 29, is given as the output "i" of the OR gate 31h, and the output "i" is taken into the multiplex transmission control circuit 32.

When the failure of the mode 8 is cleared, the output "d" of the comparator 25 switches to "L" since the resistor R3 of the bias voltage supply circuit 35 is always connected to the transmission line 20. This causes the output of the counter 28a to switch to "H", and the RS flip-flop 31j is set. This set RS flip-flop 31j causes the switches 35a and 36d to be closed, and the bias voltage supply circuit 35 and the driving circuit 36 are reconnected to the transmission lines, thus going back to the normal state of the mode 1.

Thus, in this embodiment, it is arranged so that one of the three or more comparators remains capable of receiving even if one of the transmission lines fails, and the outputs of these comparators pass through their respective differential circuits, thus automatically setting the output of the differential circuit, which is linked to a comparator connected to the faulty transmission line, to "L". Only normal signals are supplied to the multiplex transmission control circuit by using a logical sum of the outputs of those differential circuits as the input to the multiplex transmission control circuit. This enables, in this embodiment, automatic receiving without depending on message receiving even if one of the transmission lines incurs a failure, thus making it possible to perform message transmission with no waste. In addition, in this embodiment, message transmission is possible even if the transmission lines are short-circuited, permitting improved reliability of the apparatus.

Figure 5:
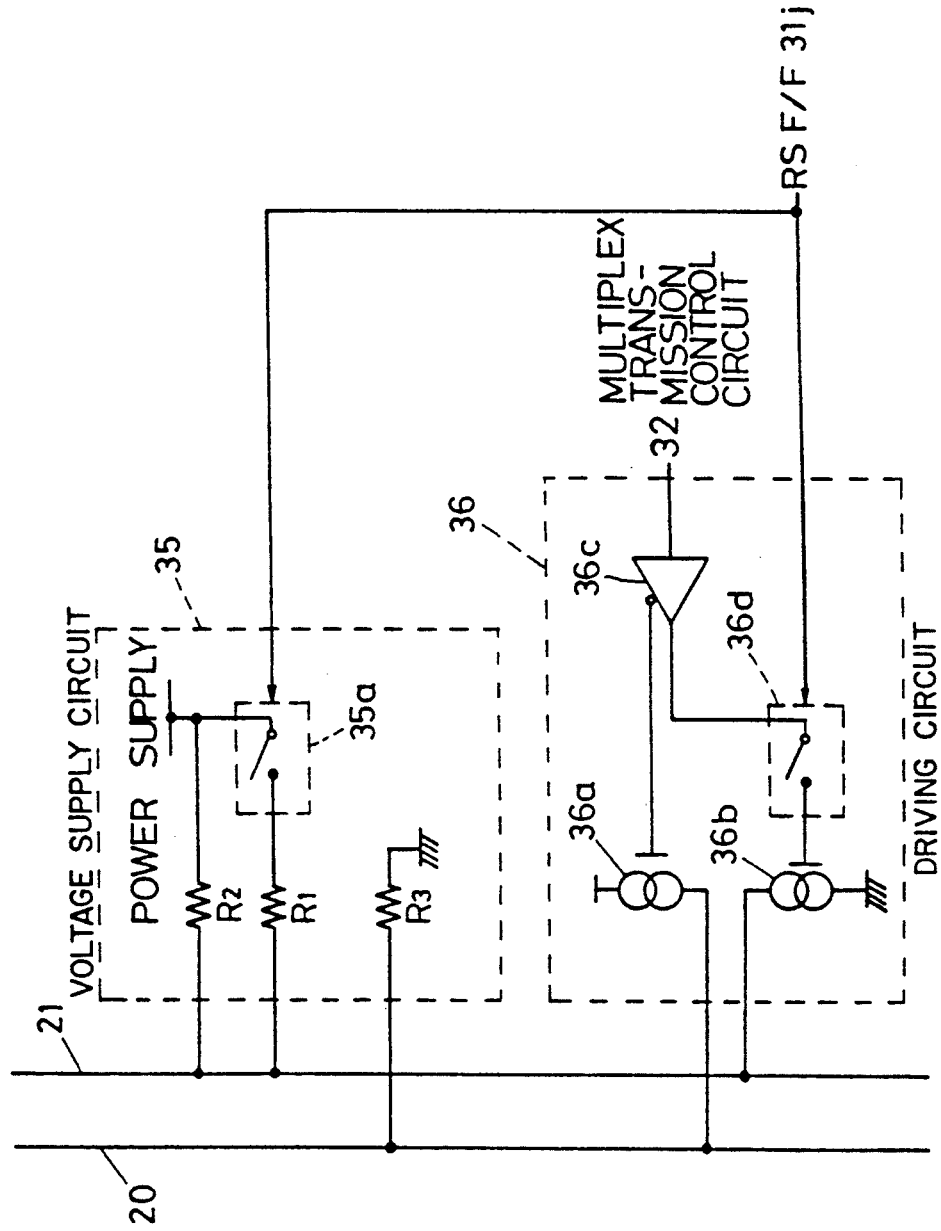
FIG. 5 is a circuit diagram which shows another embodiment of the bias voltage supply circuit and the driving circuit shown in FIG. 4.

In the second embodiment shown in FIG. 4, it is designed such that the connection between the transmission line 20 and the bias voltage supply circuit 35 and the connection between the transmission line 20 and the driving circuit 36 are controlled, but the present invention is not limited thereto. For instance, as shown in FIG. 5, it is also possible to control the connection between the transmission line 21 and the bias voltage supply circuit 35 and the connection between the transmission line 21 and the driving circuit 36, by connecting the switch 35a of the bias voltage supply circuit 35 between the resistor R1 and the power supply and also by connecting the switch 36d of the driving circuit 36 between the constant-current section 36b and the buffer 36c.

Further, the bias voltage supply circuit may be provided either at one point in a network or scattered at several points.

In another example, it is designed so that the RS flip-flop 31j in the second embodiment is set in response to a logical sum of the outputs of the counters 27a and 28a. It is also possible to design the system so that the RS flip-flop 31f is reset when the output "c" of the comparator 24 remains "H" for approximately a one-bit length, and that the RS flip-flop 31f is set when the output "c" remains "L" for a one-byte length to one-message length. In this case, there is an effect that eliminates the need of the gates 31a, 31b, and 31e.

Figure 6:
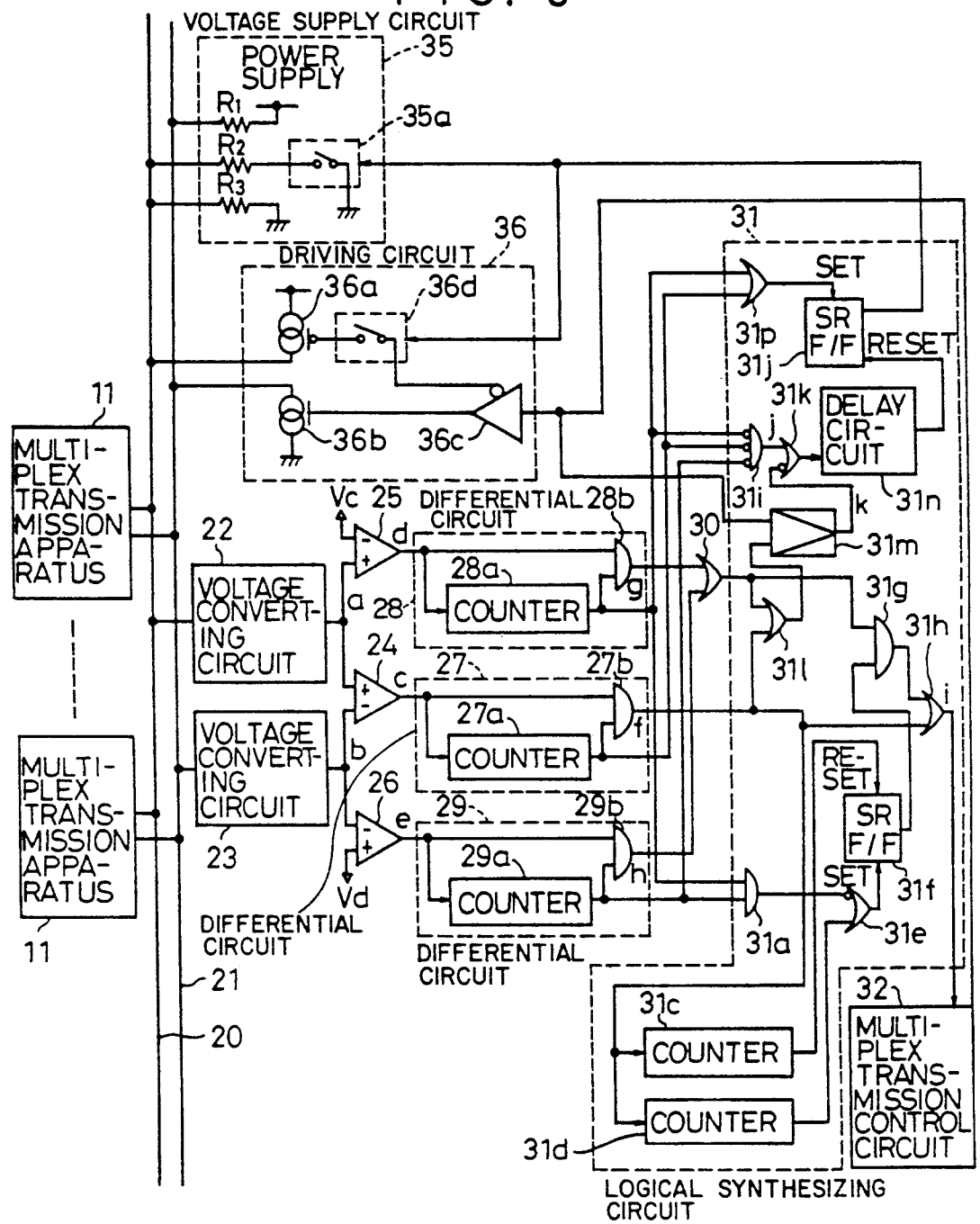
FIG. 6 is a configuration block diagram which shows the third embodiment of the multiplex transmission apparatus in accordance with the present invention.

FIG. 6 is a configuration block diagram which shows the third embodiment of the configuration of the multiplex transmission apparatus in accordance with the present invention. In the figure, the same sections as those in the second embodiment shown in FIG. 4 are assigned the same signs for the convenience of explanation.

Referring to FIG. 6, the configuration of the multiplex transmission apparatus differs from that of the aforementioned second embodiment in that another condition for resetting the RS flip-flop 31j has been added. Specifically, the outputs "f," "g," and "h" of the AND gates 27b through 29b are supplied to the OR gates 30 and 31l to calculate the logical sum, and a signal comparing circuit 31m compares the output signal, which has taken in the logical sum, with a signal transmitted by the multiplex transmission control circuit 32. Further, the comparison result "k" and the output "j" of the AND gate 31i are input to the OR gate 31k to determine the logical sum, and this output goes through a delay circuit 31n to provide the resetting condition for the RS flip-flop 31j. Also in this embodiment, it is designed so that the RS flip-flop 31j is set by the logical sum of the outputs of the counters 27a and 28a at an OR gate 31p. In this embodiment, the signal comparing circuit 31m functions to securely detect the failure of the mode 8 in Table 1 mentioned above, and the delay circuit 31n functions to absorb variations in the control time for the multiplex transmission apparatuses which are interconnected via the transmission lines.

Further, the outputs of the counters 27a through 29a are set to "L" on condition that an "H" state which lasts longer than the longest "H" signal in a message is detected. Also, the counter 31c issues an output when an "H" state approximately equivalent to a one-bit length is detected. Likewise, the counter 31d issues an output when an "L" state which lasts significantly longer than the longest "L" signal in the message is detected. This eliminates, in this embodiment, the need of the AND gate 31b shown in FIG. 4, allowing outputs of the AND gate 27b to be directly applied to the OR gate 31h.

Thus, in this embodiment, other than the effects obtained in the aforementioned second embodiment, short circuits between the transmission lines 20 and 21 can be securely detected and also the variations in the control time for the multiplex transmission apparatuses can be absorbed.

Figure 7:
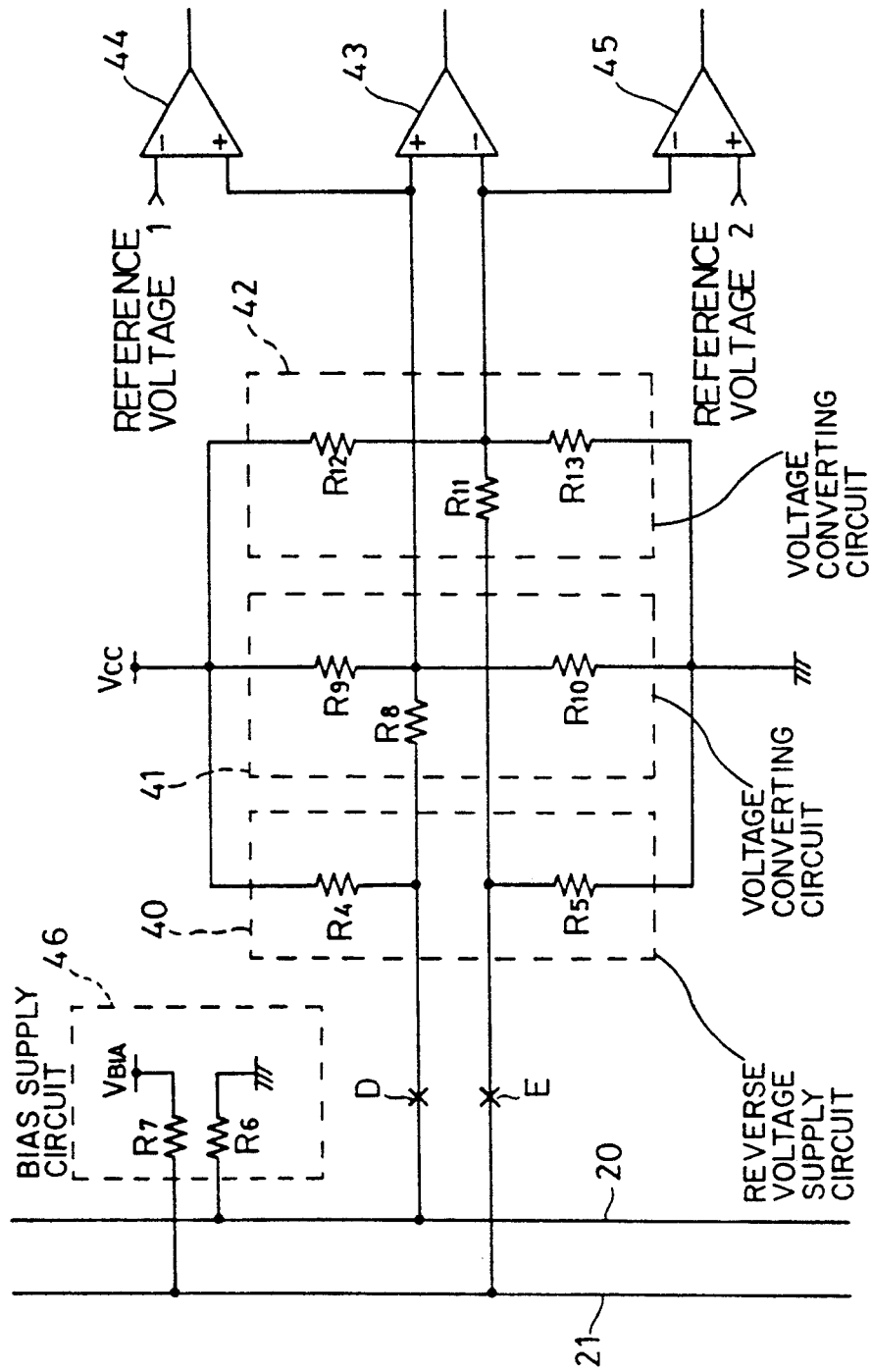
FIG. 7 shows the fourth embodiment of the multiplex transmission apparatus in accordance with the present invention and it is a configuration block diagram which shows a major section of the configuration.

FIG. 7 is the configuration block diagram of the fourth embodiment and it shows the major section of the configuration of the multiplex transmission apparatus in accordance with the present invention. Other sections of the multiplex transmission apparatus which are not shown in the figure are the same as those of the first embodiment of FIG. 1.

Referring to FIG. 7, the configuration of the multiplex transmission apparatus differs from that of the first embodiment in that nonreversing inputs of the first comparator 43 and the second comparator 44 are connected to the transmission line 20 via a voltage converting circuit 41, and that the voltage converting circuit 41 applies a bias voltage, which is opposite from that of a bias supply circuit 46 discussed later, to the transmission line 20 through a resistor R4 of a reverse-bias voltage supply circuit 40 which is interposed between the transmission line 20 and the voltage converting circuit 41.

Also, reversing inputs of the first comparator 43 and the third comparator 45 are connected to the transmission line 21 via the voltage converting circuit 42, and the voltage converting circuit 42 applies a bias voltage, which is opposite from that of the bias supply circuit 46, to the transmission line 21 through a resistor R5 of the reverse-voltage supply circuit 40 which is interposed between the transmission line 21 and the voltage converting circuit 42. Further, the bias supply circuit 46 has a bias resistor R6 of approximately 100Ω, for example, connected to the transmission line 20, and a bias resistor R7 of approximately 100Ω, for example, connected to the transmission line 21. Thus, the bias voltage is supplied to the ground potential of the aforementioned transmission line 20 via the bias resistor R6, while the bias voltage is supplied from the VBIA potential of approximately 5 V, for example, in the aforementioned transmission line 21 via the bias resistor R7.

In this embodiment, the values of the resistors R4 and R5 are set for about 100 k Ω, for example, which is adequately higher than that of the bias resistors R6 and R7 to avoid affecting the bias voltages of the transmission lines 20 and 21.

The voltage converting circuit 41 comprises resistors R8 through R10, and these resistors R8 through R10 are set for values which are within the input voltage ranges of the first comparator 43 and the second comparator 44. For instance, when a line voltage Vcc is about 5 V, the resistor R8 is set for about 100 k Ω, the resistor R9 for about 56 k Ω, and the resistor R10 for about 68 k Ω.

The voltage converting circuit 42 comprises resistors R11 through R13, and these resistors R11 through R13 are set for values which are within the input voltage ranges of the first comparator 43 and the third comparator 45. For instance, when the line voltage Vcc is about 5 V, the resistor R11 is set for about 100 k Ω, the resistor R12 for about 68 K Ω, and the resistor R13 for about 56 K Ω.

Reference voltages 1 and 2 to be supplied to the second comparator 44 and the third comparator 45 are set for a value which makes it possible to detect a failure which may take place in the transmission line 20 or 21. This value may be, for example, about Vcc/2 if the resistors R8 through R13 constituting the voltage converting circuits 41 and 42 are set for the above-mentioned values.

If the reverse-bias voltage supply circuit 40 in accordance with this embodiment is not provided, no bias voltage is supplied, and therefore, if disconnection takes place at point D of a transmission line, the voltage values of the non-reversing inputs of the first and second comparators 43 and 44 become unstable. Likewise, if disconnection takes place at point E of the transmission line, the voltage values of the reversing inputs of the first and third comparators 43 and 45 become unstable. Thus, in this case, disconnection cannot be securely detected if the reverse-bias voltage supply circuit 40 is not provided.

Accordingly, in this embodiment, by providing the reverse-bias voltage supply circuit, even if disconnection takes place at the point D or E of the transmission line, the input voltages of the first through third comparators are securely set for the opposite voltages from the bias voltage supply circuit, making it possible to detect the disconnection.

Figure 8:
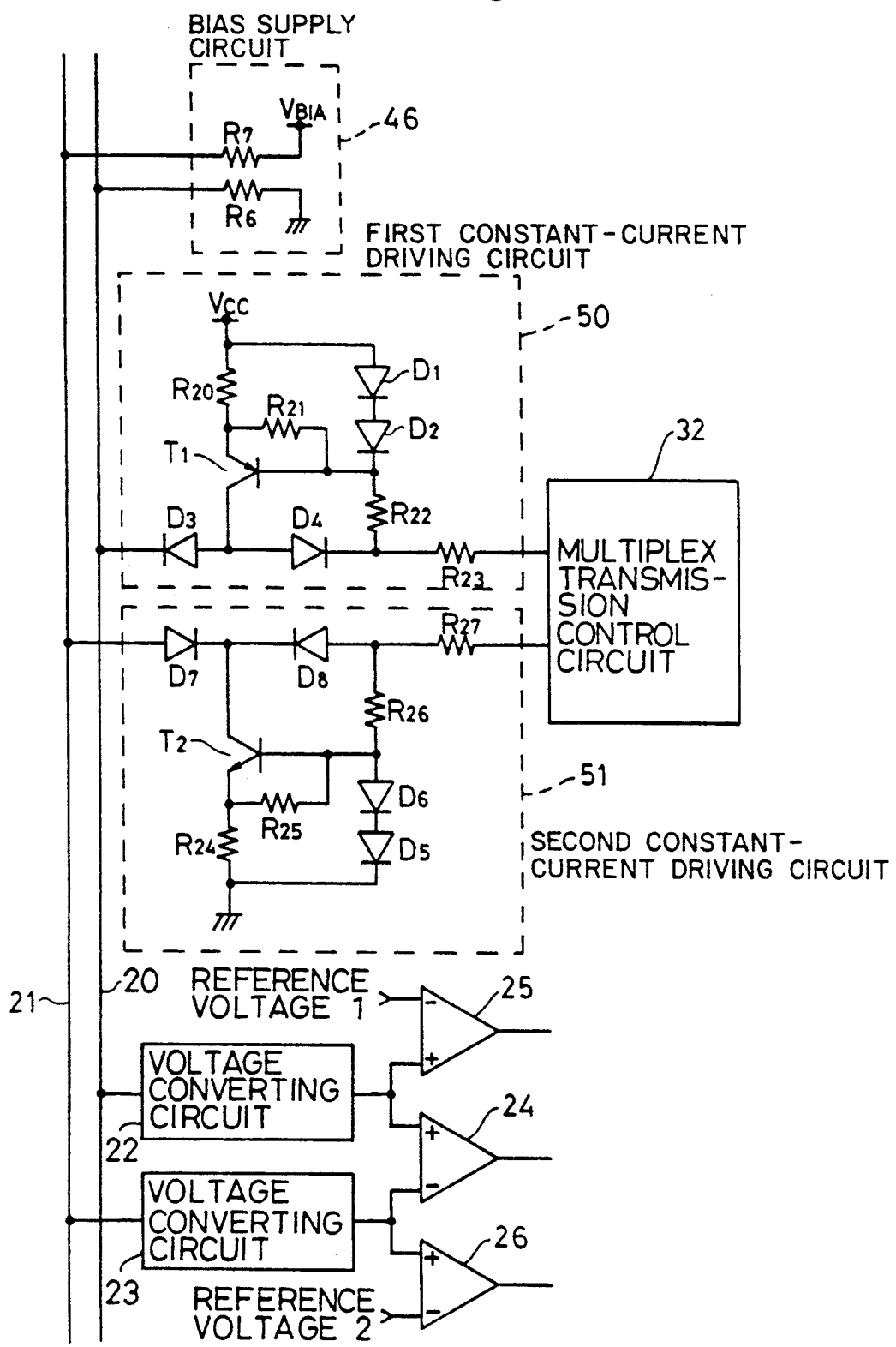
FIG. 8 shows the fifth embodiment of the multiplex transmission apparatus in accordance with the present invention and it is a configuration block diagram which shows a major section of the configuration.

FIG. 8 is the configuration block diagram of the fifth embodiment and it shows the major section of the configuration of the multiplex transmission apparatus in accordance with the present invention. The other sections of the multiplex transmission apparatus which are not shown are the same as those of the first embodiment of FIG. 1. Reference voltages 1 and 2 supplied to the second comparator 25 and the third comparator 26 are set for a value, approximately Vcc/2, for example, which enables detection of a failure which may occur in the transmission lines 20 or 21. The bias voltage supply circuit 46 has the same configuration as that of the bias voltage supply circuit shown in FIG. 7.

Referring to FIG. 8, the configuration of the multiplex transmission apparatus differs from that of the first embodiment in that transmitted data sent out from the multiplex transmission control circuit 32 is applied to the second constant-current driving circuit 51, and constant current is taken in through the transmission line 21. It also differs in that complement data of the transmitted data from the multiplex transmission control circuit 32 are applied to the first constant-current driving circuit 50, and constant current is discharged through the transmission line 20.

More specifically, the first constant-current driving circuit 50 comprises a transistor T1, diodes D1 through D4, and resistors R20 through R23. The aforementioned transistor T1, diodes D1 and D2, and the resistors R20 and R21 are decisive factors of the value of the current discharged, and the current value is determined by the voltage between the base and emitter of the transistor T1, the forward voltages of the diodes D1 and D2, and the values of the resistors R20 and R21. The resistors R22 and R23 are resistors limiting the base current of the aforementioned transistor T1. The diode D3 is a diode which prevents currents from the transmission line 20 from turning in. The diode D4 is a diode used to prevent delay in the switching speed of the transistor T1. In other words, the diode D4 functions to let currents constantly flow into the collector of the transistor T1 so that the transistor T1 no longer becomes saturated, thus preventing slowdown of switching of the transistor.

The second constant-current driving circuit 51 comprises a transistor T2, diodes D5 through D8, and resistors R24 through R27. The aforementioned transistor T2, diodes D5 and D6, and resistors R24 and R25 are decisive factors of the value of currents taken in. The current value is determined by the voltage between the base and emitter of the transistor T2, the forward voltages of the diodes D5 and D6, and the values of the resistors R24 and R25. The resistors R26 and R27 are resistors which limit the base current of the transistor T2. The diode D7 is a diode which prevents currents from the transmission line 20 from turning in. The diode D8 is a diode used to prevent delay in the switching speed of the transistor T2. In other words, the diode D8 functions to let currents constantly flow into the collector of the transistor T2 so that the transistor T2 no longer becomes saturated, thus preventing slowdown of switching of the transistor.

Thus, in this embodiment, constant-current drive is used for the driving means of the transmission lines; therefore, even if ground potential differences occur among the multiplex transmission apparatuses, the voltage value of the transmission lines can be maintained at a constant level, making it possible to reduce undesirable radiation noises produced in the transmission lines. Further, in this embodiment, the constant-current driving circuit is not saturated, causing no slowdown in the driving speed of the constant-current driving circuit. This gives an effect of ensuring simultaneity of data.

Figure 9:
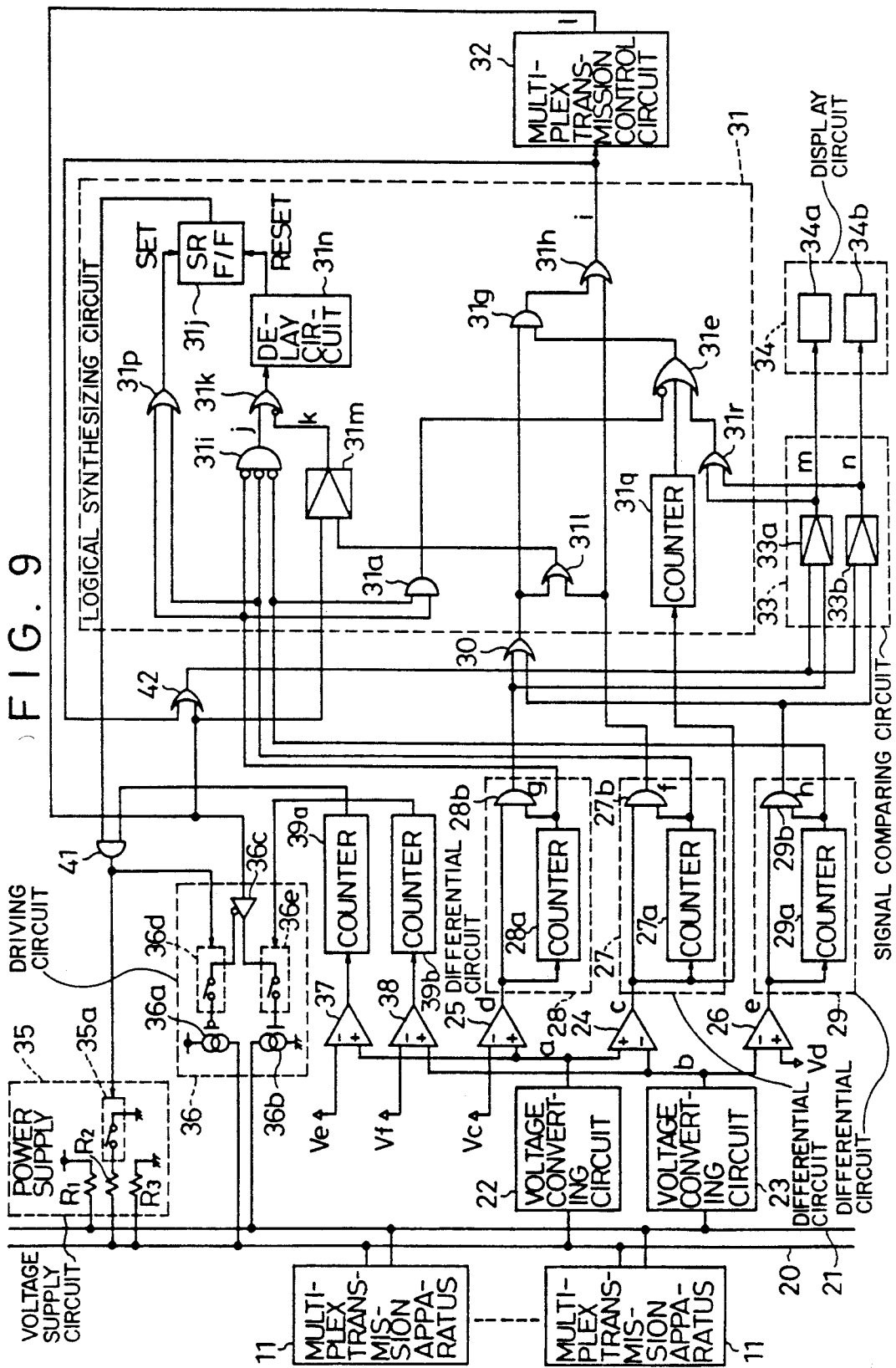
FIG. 9 is a configuration block diagram which shows the sixth embodiment of the multiplex transmission in accordance with the present invention.

FIG. 9 is the configuration block diagram which shows the sixth embodiment of the configuration of the multiplex transmission apparatus in accordance with the present invention. In this figure, the sections which are the same as those of the first embodiment of FIG. 1 and the third embodiment of FIG. 6 are assigned the same signs for the convenience of explanation.

Referring to FIG. 9, this configuration of the multiplex transmission apparatus differs from that of the aforementioned third embodiment in three points. The first point is that the apparatus has the same signal comparing circuit 33 and the display circuit 34 as in the first embodiment, and the received signal i, which is issued by the OR gate 31h and supplied to the multiplex transmission control circuit 32 and the transmitted signal 1 issued by the aforementioned multiplex transmission control circuit 32 are supplied to the OR gate 42 to calculate the logical sum which is applied to the signal comparators 33a and 33b. The second point is that a counter 31q, which receives the output "c" of the comparator 24, is installed in place of the counters 31c and 31d given in the third embodiment, comparison results (information on faults in the transmission lines) "m" and "n" of the signal comparing circuit 33 are supplied to the OR gate 31r to calculate the logical sum, the outputs of the OR gate 31r, counter 31q and AND gate 31a are supplied to the OR gate 31e, and an output of the OR gate 31e is directly applied to the AND gate 31g. The third point is that an output of a counter 39a, which counts the outputs of the comparator 37, has been added to the condition for switches 35a and 36d to disconnect the bias voltage supply circuit 35 and the constant-current section 36a from the transmission line 20, and also an output of a counter 39b, which counts the outputs of the comparator 38, has been added to the condition for a switch 36e to disconnect the constant-current section 36b from the transmission line 21.

More specifically, the signal comparing circuit 33 compares the outputs "g" and "h" of the differential circuits 28 and 29 with the received signal "i" or transmitted signal 1 which is an output from the OR gate 42. Accordingly, the display circuit 34 can indicate comparison results of the signal comparing sections 33a and 33b at the time of transmitting as well as receiving.

The counter 31q outputs "L" when the output "c" of the comparator 24 holds the "H" state for longer than the T2 time (approximately 1 bit long). The OR gate 31e issues the "L" state signal to place the AND gate 31g in the closed state when the inputs from the aforementioned counter 31q, the AND gate 31a and the OR gate 31r are all "L". This enables the OR gate 31h to supply the output "f" of the differential circuit 27 as the received signal "i" to the multiplex transmission control circuit 32. The counter 31q issues "H" when the output "c" of the comparator 24 holds the "L" state for longer than the T1 time (approximately ½ frame long). The OR gate 31e places the AND gate 31g in the open state when the input from the aforementioned counter 31q is "H". This enables the OR gate 31h to supply the logical sum of the outputs "f", "g", and "h" of the differential circuits 27, 28, and 29 as the received signal "i" to the multiplex transmission control circuit 32.

Predetermined reference voltages Ve and Vf applied to the comparators 37 and 38 are set for specified values to enable the counters 39a and 39b to detect overvoltage in the transmission line 20 or 21. The aforementioned counters 39a and 39b function to accurately judge that the transmission line 20 or 21 has recovered the normal voltage. More specifically, the counters 39a and 39b issue "L" when the outputs of the comparators 37 and 38 hold the "H" state for longer than the prescribed time, and they turn off the switch 35a of the bias voltage supply circuit 35 and the switches 36d and 36e of the constant-current sections 36a and 36b. This makes it possible, in this embodiment, to disconnect the resistor R2 of the bias voltage supply circuit 35 and the driving circuit 36 from the transmission lines 20 and 21. The counters 39a, and 39b issue "H" when the outputs of the comparators 37 and 38 hold the "L" state for longer than the predetermined time, and turn on the aforementioned switches 35a, 36d, and 36e. This makes it possible, in this embodiment, to connect the bias voltage supply circuit 35 and the driving circuit 36 to the transmission lines 20 and 21.

Thus, in this embodiment, there is an effect that information on failures in the transmission lines can be acquired also at the time of transmission rather than only at the time of receiving. In addition, in this embodiment, the counter 31q replaces the functions of the counters 31c and 31d, eliminating the need of the RS flip-flop 31f. Further, in this embodiment, the logical sums of the comparison results "m" and "n" of the signal comparing circuit 33 are connected to the OR gate 31e, so that the AND gate 31g can be opened or closed also by information on failures in the transmission lines, permitting more reliable message transmission. Furthermore, in this embodiment, the bias voltage supply circuit 35 and the driving circuit 36 can be isolated from the transmission lines when the transmission lines incur overvoltage, making it possible to protect the aforementioned bias voltage supply circuit 35 and the driving circuit 36.

What is claimed is:

1. A multiplex transmission apparatus which is interconnected to other multiplex transmission apparatuses via at least first and second common transmission lines, said multiplex transmission apparatus comprising:

converting means for converting signals of said transmission lines into corresponding voltages;

first comparing means for comparing the converted voltages of said transmission lines with each other;

second comparing means for comparing the converted voltage of said first transmission line with a predetermined reference voltage;

third comparing means for comparing the converted voltage of said second transmission line with a predetermined reference voltage;

first output means comprising first counter means for outputting a low-level signal when an output level of a comparison result of said first comparing means remains at a high level for a predetermined time, and for outputting a high-level signal when an output level of the comparison result of said first comparing means is other than this level, and first logic gate means for outputting a low-level signal as an output when an output level of said first counter means is at a low level, and for outputting an output level from said first comparing means as an output when an output level of said first counter means is at a high level;

second output means comprising second counter means for outputting a low-level signal when an output level of a comparison result of said second comparing means remains at a high level for a predetermined time, and for outputting a high-level signal when an output level of the comparison result of said second comparing means is other than this level, and second logic gate means for outputting a low-level signal as an output when an output level of said second counter means is at a low level, and for outputting an output level from said second comparing means as an output when an output level of said second counter means is at a high level;

third output means comprising counter means for outputting a low-level signal when an output level of a comparison result of said third comparing means remains at a high level for a predetermined time, and for outputting a high-level signal when an output level of the comparison result of said third comparing means is other than this level, and third logic gate means for outputting a low-level signal as an output when an output level of said third counter means is at a low level, and for outputting an output level from said third comparing means as an output when an output level of said third counter means is at a high level; and logical synthesizing means for outputting an output level of the first logic gate means as a received signal when outputs of said second and third counter means are at a high level, and for outputting logical results of the second and third logic gate means as a received signal when either output of said second and third counter means is at a low level.

2. A multiplex transmission apparatus according to claim 1, wherein said multiplex transmission apparatus further includes fault detecting means for comparing an output of said logical synthesizing means with each of the outputs of the second and third logic gate means, and for detecting occurrence of faults in said transmission lines when a difference occurs in comparison results therebetween.

3. A multiplex transmission apparatus which is interconnected to other multiplex transmission apparatuses via at least first and second common transmission lines, said multiplex transmission apparatus comprising:

bias voltage supply means, which is connected to said transmission lines, for supplying a bias voltage to said second transmission line, for supplying a bias voltage to the first transmission line in an ON state, and for interrupting a supply of bias voltage to said first transmission line in an OFF state;

first constant-current circuit means for discharging a constant current to said first transmission line, said first constant-current circuit means being connected to said first transmission line, and being driven so as to discharge said constant current to said first transmission line;

drive inhibiting means for inhibiting a drive of said first constant-current circuit means in an OFF state;

second constant-current circuit means for sinking a constant current from said second transmission line, said second constant-current circuit means being connected to said second transmission line, and being driven so as to sink said constant current from said second transmission line;

converting means for converting signals of said transmission lines into corresponding voltages;

first comparing means for comparing the converted voltages of said transmission lines with each other;

second comparing means for comparing the converted voltage of said first transmission line with a predetermined reference voltage;

third comparing means for comparing the converted voltage of said second transmission line with a predetermined reference voltage;

first output means comprising first counter means for outputting a low-level signal when an output level of a comparison result of said first comparing means remains at a high level for a predetermined time, and for outputting a high-level signal when an output level of the comparison result of said first comparing means is other than this level, and first logic gate means for outputting a low-level signal as an output when an output level of said first counter means is at a low level, and for outputting an output level from said first comparing means as an output when an output level of said first counter means is at a high level;

second output means comprising second counter means for outputting a low-level signal when an output level of a comparison result of said second comparing means remains at a high level for a predetermined time, and for outputting a high-level signal when an output level of the comparison result of said second comparing means is other than this level, and second logic gate means for outputting a low-level signal as an output when an output level of said second counter means is at a low level, and for outputting an output level from said second comparing means as an output when an output level of said second counter means is at a high level;

third output means comprising third counter means for outputting a low-level signal when an output level of a comparison result of said third comparing means remains at a high level for a predetermined time, and for outputting a high-level signal when an output level of the comparison result of said third comparing means is other than this level, and third logic gate means for outputting a low-level signal as an output when an output level of said third counter means is at low level output, and for outputting an output level from said third comparing means as an output when an output level of said third counter means is at a high level; and logical synthesizing means for:

outputting an output level of the first logic gate means as a received signal when the outputs of said second and third counter means are at a high level, and for outputting logical results of the second and third logic gate means as a received signal when either output of said second and third counter means is at a low level, and placing said bias voltage supply means and said constant-current means in an ON state when the output of the second counter means is at a high level, and placing said bias voltage supply means and said drive inhibiting means in an OFF state when the outputs of the first through third counter means are at a low level.

4. A multiplex transmission apparatus according to claim 3, wherein said multiplex transmission apparatus further includes reverse-bias voltage supply means for supplying a bias voltage opposite to the bias voltage supplied from said bias-voltage supply means to said transmission lines to stabilize a potential even if said transmission lines are open, said reverse-bias voltage supply means including a resistor connected between said first transmission line and said converting means, and a resistor connected between said second transmission line and said converting means.

5. A multiplex transmission apparatus according to claim 3, wherein said constant-current circuit means have diode means for preventing said constant-current circuit means from being saturated.

6. A multiplex transmission apparatus according to claim 3, wherein said constant-current circuit means have diode means for preventing said constant-current circuit means from being saturated.

7. A multiplex transmission apparatus which is interconnected to other multiplex transmission apparatuses via at least first and second common transmission lines, said multiplex transmission apparatus comprising:

bias voltage supply means which is connected to said transmission lines, for supplying a bias voltage to said second transmission line, for supplying a bias voltage to said first transmission line in an ON state, and for interrupting a supply of bias voltage to said first transmission line in an OFF state;

first constant-current circuit means for discharging a constant current to said first transmission line, said first constant-current circuit means being connected to said first transmission line, and being driven so as to discharge said constant current to said first transmission line;

drive inhibiting means for inhibiting a drive of said first constant-current circuit means in an OFF state;

second constant-current circuit means for sinking a constant current from said second transmission line, said second constant-current circuit means being connected to said second transmission line, and being driven so as to sink said constant current from said second transmission line;

converting means for converting signals of said transmission lines into corresponding voltages;

first comparing means for comparing the converted voltages of said transmission lines with each other;

second comparing means for comparing the converted voltage of said first transmission line with a predetermined reference voltage;

third comparing means for comparing the converted voltage of said second transmission line with a predetermined reference voltage;

first output means comprising first counter means for outputting a low-level signal when an output level of a comparison result of said first comparing means remains at a high level for a predetermined time, and for outputting a high-level signal when an output level of the comparison result of said first comparing means is other than this level, and first logic gate means for outputting a low-level signal as an output when an output level of said first counter means is at a low level, and for outputting an output level from said first comparing means as an output when an output level of said first counter means is at a high level;

second output means comprising second counter means for outputting a low-level signal when an output level of a comparison result of said second comparing means remains at a high level for a predetermined time, and for outputting a high-level signal when an output level of the comparison result of said second comparing means is other than this level, and second logic gate means for outputting a low-level signal as an output when an output level of said second counter means is at a low level, and for outputting an output level from said second comparing means as an output when an output level of said second counter means is at a high level;

third output means comprising third counter means for outputting a low-level signal when an output level of a comparison result of said third comparing means remains at a high level for a predetermined time, and for outputting a high-level signal when an output level of the comparison result of said third comparing means is other than this level, and third logic gate means for outputting a low-level signal as an output when an output level of said third counter means is at a low level, and for outputting an output level from said third comparing means as an output when an output level of said third counter means is at a high level;

fourth comparing means for comparing driving signals of said constant-current circuits and logical results of outputs from said first through third output means, and for outputting a low-level signal when comparison results thereof are not correspondent with each other; and logical synthesizing means for:

outputting an output level of the first logic gate means as a received signal when the outputs of said second and third counter means are at a high level, and for outputting logical results of the second and third logic gate means as a received signal when one of the outputs of said second and third counter means is at a low level, placing said bias voltage supply means and said constant-current means in an ON state when the output of the second counter means is at a high level, and placing said bias voltage supply means and said drive inhibiting means in an OFF state when at least one of the following conditions exist:
the outputs of the first through third counter means are at a low level, and
the output of said fourth comparing means is at a low level.

8. A multiplex transmission apparatus according to claim 7, wherein said logical synthesizing means includes delay circuit means for delaying an output of said fourth comparing means to eliminate dispersion of a control time with other multiplex transmission apparatuses.

9. A multiplex transmission apparatus according to claim 7, wherein said multiplex transmission apparatus further includes reverse-bias voltage supply means for supplying a bias voltage opposite to the bias voltage supplied from said bias-voltage supply means to said transmission lines to stabilize a potential even if said transmission lines are open, said reverse-bias voltage supply means including a resistor connected between said first transmission line and said converting means, and a resistor connected between said second transmission line and said converting means.

10. A multiplex transmission apparatus which is interconnected to other multiplex transmission apparatuses via at least first and second common transmission lines, said multiplex transmission apparatus comprising:

bias voltage supply means which is connected to said transmission lines, for supplying a bias voltage to said second transmission line, for supplying a bias voltage to said first transmission line in an ON state, and for interrupting a supply of bias voltage to said first transmission line in an OFF state;

first constant-current circuit means for discharging a constant current to said first transmission line, said first constant-current circuit means being connected to said first transmission line, and being driven so as to discharge a constant current to said first transmission line;

first drive inhibiting means for inhibiting a drive of said first constant-current circuit means in an OFF state;

second constant-current circuit means for sinking a constant current from said second transmission line, said second constant-current circuit means being connected to said second transmission line, and being driven so as to sink said constant current from said second transmission line;

second drive inhibiting means for inhibiting a drive of said second constant-current circuit means in an OFF state;

converting means for converting signals of said transmission lines into corresponding voltages;

first comparing means for comparing the converted voltages of said transmission lines with each other;

second comparing means for comparing the converted voltage of said first transmission line with a predetermined reference voltage;

third comparing means for comparing the converted voltage of said second transmission line with a predetermined reference voltage;

first output means comprising first counter means for outputting a low-level signal when an output level of a comparison result of said first comparing means remains at a high level for a predetermined time, and for outputting a high-level signal when an output level of the comparison result of said first comparing means is other than this level, and first logic gate means for outputting a low-level signal as an output when an output level of said first counter means is at a low level, and for outputting an output level from said first comparing means as an output when an output level of said first counter means is at a high level;

second output means comprising second counter means for outputting a low-level signal when an output level of a comparison result of said second comparing means remains at a high level for a predetermined time, and for outputting a high-level signal when an output level of the comparison result of said second comparing means is other than this level, and second logic gate means for outputting a low-level signal as an output when an output level of said second counter means is at a low level, and for outputting an output level from said second comparing means as an output when an output level of said second counter means is at a high level;

third output means comprising third counter means for outputting a low-level signal when an output level of a comparison result of said third comparing means remains at a high level for a predetermined time, and for outputting a high-level signal when an output level of the comparison result of said third comparing means is other than this level, and third logic gate means for outputting a low-level signal as an output when an output level of said third counter means is at a low level, and for outputting an output level from said third comparing means as an output when an output level of said third counter means is at a high level;

fourth comparing means for comparing driving signals of said constant-current circuits and logical results of the outputs from said first through third output means, and for outputting a low-level signal when comparison results thereof are not correspondent with each other;

logical synthesizing means for:
outputting an output level of the first logic gate means as a received signal when the outputs of said second and third counter means are at a high level, and for outputting logical results of the second and third logic gate means as a received signal when one of the outputs of said second and third counters is at a low level, placing said bias voltage supply means and said constant-current means in an ON state when the output of the second counter means is at a high level, and placing said bias voltage supply means and said drive inhibiting means in an OFF state when at least one of the following conditions exist:
the outputs of the first through third counter means are at a low level, and
the output of said fourth comparing means is at a low level;

logic gate means for outputting a logical sum of the output of said logical synthesizing means and the driving signals of said constant-current circuit means; and fault detecting means for comparing the output of said logic gate means with the outputs of the second and third logic gate means, and for detecting occurrence of faults in said transmission lines when a difference occurs in the comparison results.

11. A multiplex transmission apparatus according to claim 10, wherein said multiplex transmission apparatus further includes fifth comparing means for comparing the converted voltage of said first transmission line with a predetermined reference voltage, sixth comparing means for comparing the converted voltage of said second transmission line with a predetermined reference voltage, fourth counter means for placing said bias voltage supply means and said first drive inhibiting means in an OFF state when an output of the comparison result of said fifth comparing means remains at a high level for a predetermined time, and fifth counter means for placing said second drive inhibiting means in an OFF state when an output of the comparison result of said sixth comparing means remains at a high level for a predetermined time.

12. A multiplex transmission apparatus according to claim 10, wherein said logical synthesizing means includes delay circuit means for delaying an output of said fourth comparing means to eliminate dispersion of a control time with other multiplex transmission apparatuses.

13. A multiplex transmission apparatus according to claim 10, wherein said multiplex transmission apparatus further includes reverse-bias voltage supply means for supplying a bias voltage opposite to the bias voltage supplied from said bias-voltage supply means to said transmission lines to stabilize a potential even if said transmission lines are open, said reverse-bias voltage supply means including a resistor connected between said first transmission line and said converting means, and a resistor connected between said second transmission line and said converting means.

14. A multiplex transmission apparatus according to claim 10, wherein said constant-current circuit means have diode means for preventing said constant-current circuit means from being saturated.

* * * * *